Oct. 18, 1927.
H. FÖTTINGER
1,646,020
DIFFERENTIAL GEAR FOR MOTOR VEHICLES
Filed March 25, 1925   3 Sheets-Sheet 2
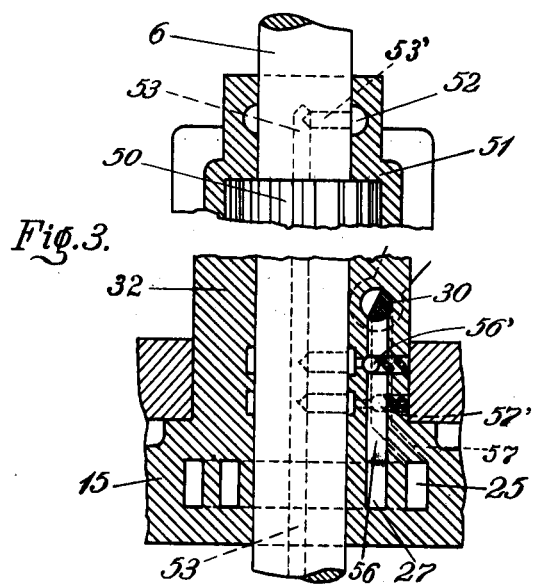
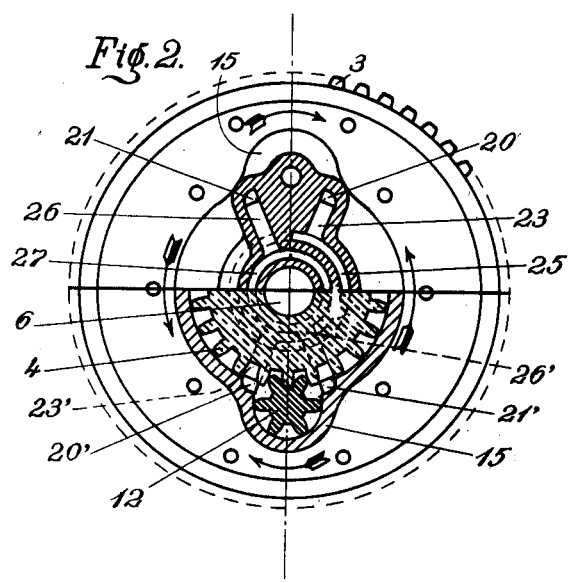
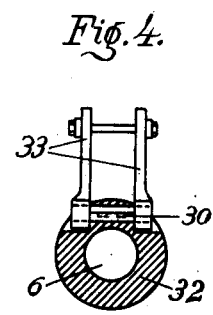
Inventor
*Hermann Föttinger*
By *Dowell & Dowell*
Attorneys Inventor
*Hermann Föttinger*

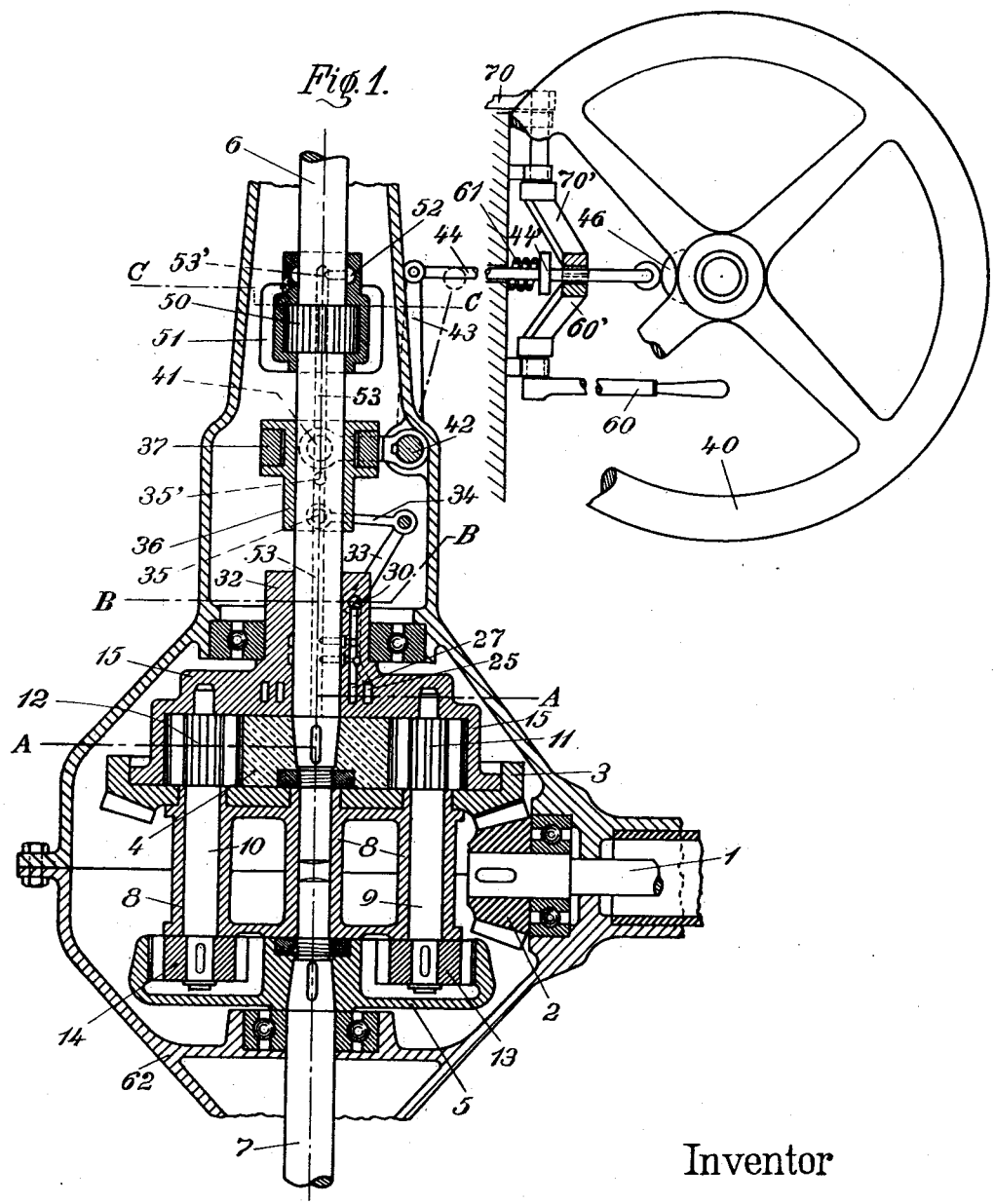

By *Dowell & Dowell,*
Attorneys

Patented Oct. 18, 1927.

1,646,020

UNITED STATES PATENT OFFICE.

HERMANN FÖTTINGER, OF BERLIN-WILMERSDORF, GERMANY.

DIFFERENTIAL GEAR FOR MOTOR VEHICLES.

Application filed March 25, 1925, Serial No. 18,291, and in Germany April 5, 1924.

This invention relates to differential gears used in motor vehicles for propelling purposes, and especially to such differential gears which are combined with additional locking means for wholly or partially checking its operation.

The main object of the invention is to provide a gear having multiple effect, but which is simple and compact in its construction and ready and reliable in its operation, while the entire appliance will be of comparatively small weight.

This object is attained by employing part of the gear itself as a fluid pressure pump the circuit of which can be intercepted autocatically or at will, suitable controlling mechanisms being provided for said operation, so that the differential operation can temporarily be suspended.

Other objects and features of the invention including certain details of construction and combination of parts will be hereinafter more particularly described and claimed.

In the accompanying drawings, which form a part of this specification, an embodiment of the invention is illustrated.

Fig. 1 is a horizontal longitudinal section of a differential gear constructed according to the invention; parts of the steering mechanism connected therewith being shown as seen from above;

Fig. 2 is a vertical cross-section on the line A—A of Fig. 1, the section of the differential box being omitted;

Fig. 3 shows a fragmental section of an auxiliary pump for reconveying the liquid to the main gear, and of other parts;

Fig. 4 is a vertical sectional elevation on the line B—B of Fig. 1 with a controlling throttling valve represented in side view;

Figure 5:
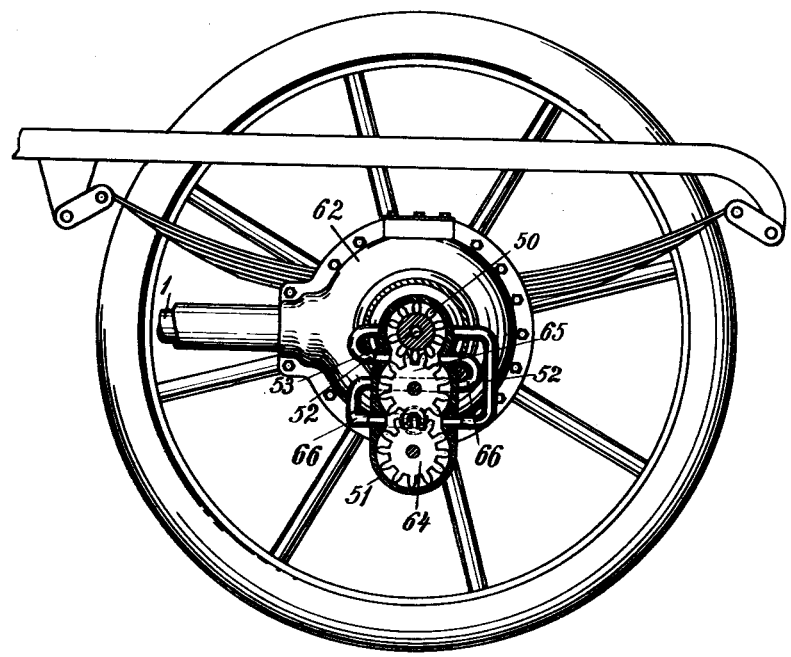
Fig. 5 shows, on a smaller scale, in a vertical section on the line C—C of Fig. 1 the auxiliary pump; the differential box and other parts being represented in side elevation.
Figure 6:
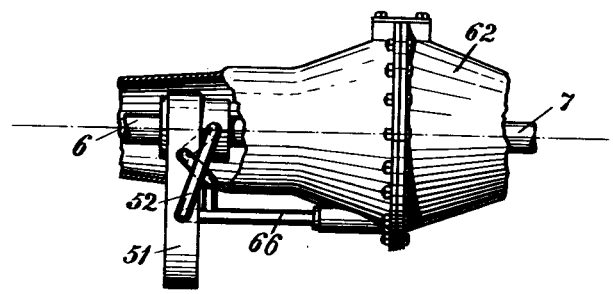
Fig. 6 is a partial view of the rear axle box and auxiliary pump, as seen from behind.

Referring to Fig. 1, 2 indicates the bevel pinion of the transmission shaft 1 meshing with the bevel wheel 3 of the spur differential gear shown. The toothed wheels or spur gears 4 and 5 are keyed to the rear-axle shafts 6 and 7, respectively. The spur-pinion carrier or yoke 8 is fastened to one side of the bevel-wheel 3 and forms a journal for the shafts 9 and 10 of the pinions 11 to 14. The planet gear or spur-pinions 11 and 12 gear with the internal teeth of the toothed wheel or gear 4, and the pinions 13 and 14 gear with the internal teeth of the toothed wheel or gear 5. The differential as so far described is of well known construction.

According to the invention the differential gear or a part of it is constructed and used as a geared pump. To this effect the gear wheels 4, 11 and 12 are enclosed in the housing 15 fastened to the other side of the wheel 3 and arranged therein in such a suitable manner as to act as the movable parts of a geared pump.

Assuming the rear axle shaft 6 moving faster than the shaft 7, the toothed wheels 4, 11 and 12 revolve in the directions indicated by the arrows in Fig. 2. They carry the pressure fluid, preferably lubricating oil, in the like directions and produce pressure in the spaces 20 and 20', and depression or suction in the spaces 21 and 21'. These spaces communicate with each other in an appropriate manner. For instance, the space 20 may be connected by an oil duct with the space 21 and the space 20' with the space 21' or these spaces may be connected with each other in series.

As shown in Fig. 2, ducts 23 and 23' lead from the pressure spaces 20 and 20' to an annular pressure channel 25 and the ducts 26 and 26' lead from the suction spaces 21 and 21' to an annular suction channel 27. The channels 25 and 27 communicate by some throttling means so that at every rotary movement of the differential shafts 6 and 7 relatively to each other oil will be pressed through the throttling means producing a great back-pressure opposing the said relative rotary movement of the shafts. If the throttling means are fully closed the resistance against the relative rotary movement grows to a maximum, the operation of the differential is eliminated and the rear axle shafts are almost fixedly coupled. On the other hand with open throttling means the resistance against the flow of the oil is very small and the differential gear operates in the ordinary manner when the car is turning curves.

It is a special advantage of the invention that the adjustment of the throttling means can operatively be controlled by the steering gear. In the middle or straight ahead position of the steering gear the throttling means are closed, while when taking curves owing to the position of the steering gear the throttling means are opened.

To this end the housing 15 possesses a boss or hub 32 coaxial with the shaft 6. The annular channels 25 and 27 are in open connection with branch ducts 56 and 57, respectively, which are arranged axially in the boss 32 and may be put in communication with each other by a valve 30. The rotary valve 30 is fastened to arms 33 (see Fig. 4) linked by a member 34 to the pivots 35 of a sleeve 36 which rotates with the housing 15 on the shaft 6 and can be longitudinally moved on this shaft for the purpose of adjusting the rotary valve 30. In the shown position the valve 30 is closed. In the position 35' of the pivots (shown by a dotted circle) the valve is open. The longitudinal movement of the sleeve 36 is effected by a collar 37 and lever 41 keyed to a shaft 42 which can be rocked by a lever 43. The lever 43 is fastened to the shaft 42 on the end thereof projecting from the axle casing and is linked at its other end to a rod 44. The rod 44 is slidingly journalled in the car-frame, its free end being held in contact with a cam 46 of the steering shaft by a spring 61. It will be understood that the movement of the steering handwheel 40 affects by these means automatically the position of the valve 30. The valve 30 may also be controlled by the forked arm 60' of a special hand-lever 60, which acts upon a flange 44' of the rod 44. Small movements of the steering hand wheel 40 do not affect in any appreciable degree the position of the valve 30, while in the case of great turning movements the free flow section of the valve rapidly grows. This is attained in the shown embodiment by the toggle joint like arrangement of the levers 33 and 34, but the same effect may be obtained by eccentric cams or by cam-grooves on the steering gear or on the collar 36, as known in the art.

As the wheels are liable to skidding when the motor-car is braked the valve-throttling means may also be connected to the brake or to its operating mechanism in such a way as to fully close the valve and to lock the differential when the brake is applied. For example, a bell crank lever 70 and 70', similar to the lever 60, 60' and operating in like manner, may be connected to the usual brake rod. Thus the throttling valve 30 may be controlled by the described controlling mechanisms alternately or contemporaneously.

The pumping action of the toothed wheels 4, 11 and 12 may become ineffective by the foaming of the oil. To eliminate this possibility an auxiliary pump 51 may be provided for feeding the oil from a low point of the differential-box 62 into the gear housing 15. This auxiliary pump is preferably likewise a gear-pump. It consists, as shown in Fig. 5, of the toothed wheels 64 and 65 driven by the wheel 50 arranged on the shaft 6. The oil enters into the auxiliary pump through the suction pipe 66 and leaves it through a pressure channel 52, from which it is fed through a radial bore 53' of the shaft 6 into an axial bore 53 leading according to the direction of rotation of the differential by means of check-valves 56' and 57' into the annular channel 25 or into the channel 27 of the boss 32.

Several changes may be made without departing from the spirit of the invention. It is therefore immaterial how the oil-flow is produced, by a geared pump or by a centrifugal pump revolving with the pinion-carrier 8 like a brake-dynamometer. For the same reason a stationary plunger-pump could be provided for. In every case the pump may be driven by appropriate gearing at high speeds to increase the effect to be obtained. Instead of the spur-differential shown a bevel-wheel differential may be used. It is finally for the invention quite irrelevant what type and what arrangement of the change speed gear is used.

What I claim as my invention, is—

1. A differential gear for motor vehicles comprising in combination with a driving shaft and pinion, a casing, shafts co-axially journaled in said casing, toothed-wheels or gears fixed on said shafts, a carrier member, spur-pinions carried by said member in inter-related engagement with said toothed-wheels or gears and a gear also carried by said member in driven engagement with said driving pinion, one of said toothed-wheels or gears with the spur-pinions engaging therewith being adapted to cooperate as a gear pump independently of the differential action of the inter-related differential gears, together with means controlling the flow of liquid displaced by the gears cooperating as the pump.

2. A differential gear for motor vehicles comprising in combination with a drive shaft and pinion, a casing, shafts co-axially journaled in said casing, spur gears fixed on said shafts, a carrier member, spur-pinions carried by said member in engagement with said spur-gears, a bevel-gear also carried by said member in driven engagement with said drive pinion, one of said spur-gears and the spur-pinions engaging therewith being employed as a gear pump operative independently of their differential relation and cooperation with the other gears, means embodying liquid conveying ducts connecting the pressure sides of the pumping gears to the suction sides thereof and means controlling the flow of liquid through said ducts.

3. A differential gear for motor vehicles comprising in combination with a drive shaft and pinion, a casing, shafts co-axially journaled in said casing, spur gears fixed on said shafts, a carrier member, spur-pinions carried by said member in engagement with said spur gears, a bevel-gear also carried by said member in driven engagement with said drive pinion, one of said spur gears and the spur-pinions engaging therewith being employed as a gear pump operable independently of the differential action between the inter-related gears, a liquid circuit connecting the pressure and suction sides of the pumping gears and throttling means controlling liquid flow through said circuit.

4. A differential gear for motor vehicles comprising in combination with a drive shaft and pinion, a casing, shafts coaxially journaled in said casing, spur-gears fixed on said shafts, a carrier member, spur-pinions carried by said member in engagement with said spur-gears, a bevel-gear also carried by said member in driven engagement with said drive pinion, one of said spur-gears and the spur-pinions engaging therewith being embodied in a gear pump operative independently of differential action between the inter-related gears, a liquid circuit connecting the pressure and suction sides of the pumping gears and throttling means connected with and operable by the steering gear of the vehicle for controlling the flow of liquid through said circuit.

5. A differential gear for motor vehicles comprising in combination, a casing, shafts journaled co-axially in said casing, spur-gears fixed on said shafts, a carrier member, spur-pinions carried by said member in engagement with said spur-gears, a bevel-gear also carried by said member by which the latter is driven, and means adapting one of said spur-gears and the spur-pinions engaging therewith to cooperate as a fluid gear pump operative independently of the differential action between the inter-related gears to equalize the drive imparted to said shafts, said last mentioned means including a liquid circuit connecting the pressure and suction sides of the pumping gears, together with throttling means therefor.

6. A differential gear for motor vehicles comprising in combination, a casing, shafts journaled co-axially in said casing, spur-gears fixed on said shafts, a carrier member, spur-pinions carried by said member in engagement with said spur-gears, a bevel-gear also carried by said member by which the latter is driven and means adapting one of said spur-gears and the spur-pinions engaging therewith to cooperate as a fluid gear pump operative independently of the differential action between the inter-related gears to equalize the drive imparted to said shafts, together with an auxiliary pump for supplying fluid to said pumping gears.

7. A differential gear for motor vehicles comprising in combination with a drive shaft and pinion, a casing, shafts co-axially journaled in said casing, spur gears fixed on said shafts, a carrier member, spur-pinions carried by said member in engagement with said spur-gears, a bevel-gear also carried by said member in driven engagement with said drive pinion, one of said spur-gears and the spur-pinions engaging therewith being embodied in a gear pump operative independently of differential action between the inter-related gears, a liquid circuit connecting the pressure and suction sides of the pumping gears and throttling means connected with and operable by the brake gear of the vehicle for controlling the flow of liquid through said circuit.

8. A differential gear for motor vehicles comprising in combination with a driving shaft and pinion, a casing, shafts journaled in said casing, spur-gears opposingly fixed on said shafts, a carrier member intermediate said spur-gears, spur-pinions carried on opposite sides of said member in engagement with said spur-gears, a bevel-gear also carried by said member in driven engagement with said driving pinion, means adapting one of said spur-gears and the spur-pinions engaging therewith to operate as a gear pump independently of the differential operation of the inter-related gears for creating a fluid pressure acting upon one of the spur-gears to normally restrict relative rotation between said shafts whereby the latter will rotate in unison, a fluid circuit connecting the pressure sides of the pumping gears to the suction sides thereof and means controlling the flow of fluid through said circuit.

In testimony whereof I have signed my name to this specification.

Dr. HERMANN FÖTTINGER.